United States Patent [19]

Prozzo et al.

[11] 4,122,504
[45] Oct. 24, 1978

[54] TAPE TRANSPORT WITH DRIVE DRUMS SURFACE DRIVEN WITH THE SAME CAPSTAN AT A CONSTANT TANGENTIAL VELOCITY

[75] Inventors: George P. Prozzo, Rochester; Ellis Speicher, Petersburg, both of Ill.

[73] Assignee: Sangamo Weston, Inc., Springfield, Ill.

[21] Appl. No.: 788,443

[22] Filed: Apr. 18, 1977

[51] Int. Cl.² ............... G11B 15/26; G11B 15/60; G11B 15/43; G11B 15/18
[52] U.S. Cl. ............................ 360/90; 74/202; 226/188; 226/193; 242/182; 360/130; 360/71
[58] Field of Search ............... 360/90, 130, 83, 71–74, 360/88; 242/76, 65–66, 182–183; 226/24, 185, 188, 192, 193–194, 49; 74/202–204

[56] References Cited

U.S. PATENT DOCUMENTS

| | | | |
|---|---|---|---|
| 3,045,072 | 6/1962 | Brede | 360/90 |
| 3,180,549 | 4/1965 | Buhrendorf et al. | 242/182 |
| 3,405,855 | 10/1968 | Daly et al. | 226/193 |
| 3,528,309 | 9/1970 | Laybounn | 74/202 |
| 3,779,481 | 12/1973 | Wilson | 242/182 |
| 3,843,035 | 10/1974 | Fitterer et al. | 242/76 |
| 3,945,036 | 3/1976 | Karsh | 360/90 |
| 4,017,904 | 4/1977 | Tsukamoto et al. | 360/130 |

OTHER PUBLICATIONS

IBM Tech. Disclosure Bulletin, Capstan Surface Grooves to Improve Tape Guidance, J. W. Lewis et al., vol. 14, No. 3, Aug. 1971, p. 3.

Primary Examiner—Alfred H. Eddleman
Attorney, Agent, or Firm—Emrich, Root, O'Keeffe & Lee

[57] ABSTRACT

A low-mass, short loop transport wherein the span of tape passing the inter-leaved head assembly is close-coupled and unsupported, with the turn-around points for the tape being at the beginning and end of the span in either direction of travel, thereby reducing head wear, skew, flutter and other undesirable characteristics. The tape is passed from the supply reel through a vacuum tensioning chamber over a pair of relatively large diameter low-mass drums defining the span or section of tape adjacent the head assembly to a second vacuum tensioning chamber and thence to the take-up reel. The drums are directly driven by peripheral contact with a capstan in both the record/read mode and the fast transport lift mode of operation. The drums may be mounted on movable eccentric shafts so that their axes of rotation can be shifted in a small arc carrying the drums in a manner to bring the span of the tape into sequential contact with the array of transducers in the head assembly or carry the drums and span of tape away from the head assembly in the lift mode of operation.

35 Claims, 16 Drawing Figures

TAPE TRANSPORT WITH DRIVE DRUMS SURFACE DRIVEN WITH THE SAME CAPSTAN AT A CONSTANT TANGENTIAL VELOCITY

BACKGROUND OF THE INVENTION

The past 5 years has seen a new generation of analog and digital data measuring and analyzing equipment with ever-increasing performance requirements for their instrumentation grade laboratory tape transports. The impact of the integrated circuit has resulted in transducer preamplifier designs with lower drift, wider band width, better signal-to-noise ratios, higher common mode rejection, lower distortion, and the like.

Highly accurate A/D converters capable of generating data at rates of $80 \times 10^6$ bits per second are available. Data conditioners, such as logarithmic compressors/expanders, high speed multiplexers, multilevel amplitude and phase modulators are used in many systems. Sophisticated real time wave analyzers permit examination of data down to $\frac{1}{2}$ hertz band width and versatile computer programs allow detailed examination of data under different conditions.

In many instances, the data appears as short bursts of less than 1 minute duration but with frequency content of 4 mHz or higher. In other applications, the event may last many hours or days. In the former case, it is often necessary to expand a one second event over several minutes for proper analysis and in the latter case, economy may dictate that data gathered over several days be analyzed in a few hours. Often the analyzing is done at locations other than where the event took place.

In a number of these sophisticated applications the tape transports available today may often be the limiting factor in data analysis by reason of the introduction of errors in amplitude, time, and other factors, into the recorded data. Certain errors or limitations are imposed by the storage media (ferric oxide coated Mylar tape), but it is unlikely that the transport design has reached a state of excellence wherein the tape is the complete limiting factor.

There is a need for the improvement of many performance features not necessarily related to the tape, including (1) the provision of a recorder with greatly increased slew speeds for faster access to isolated pieces of data, (2) improved tape utilization by increasing the number of tracks per inch, (3) wider range of tape speeds for greater time-base expansion or compression, longer recording time and greater band width, (4) substantially lower velocity errors (flutter) for significant improvements in time-base errors, (5) precisely controlled tape tensioning under all modes of operation for reduction of tape damage (especially 0.5 mil. tape) and head wear, (6) improved skew characteristics for reduced interchannel time displacement errors, and (7) optimization of head and preamplifier designs for increased signal to noise ratios.

Tape recorders are generally identified as being of an open-loop configuration, a closed-loop configuration or a zero-loop configuration. In systems so designated, the loop is that section of the tape which passes the transducers under tension supplied by restraints at the respective ends. In the open-loop configuration, the tape is engaged by a capstan which performs the metering function and back tension is provided solely by the supply source. The length of tape between the take-up and supply reel is therefore unsupported, and there is little or no isolation of the portion of the tape at the transducers from the reel drives. Pinch rollers are frequently used in such systems, and in certain types of pinch roller installations, additional flutter and skew problems are introduced.

In the closed-loop configuration the section of tape passing the transducers is controlled by a metering element (usually through frictional contact at both ends of the passage). Thus, the metering element may be a single capstan, which the tape contacts twice, or, alternatively, may comprise two separate capstans which are mechanically connected. In the closed-loop tape system, there is a spring-mass by reason of the fact that the turn-around point for the tape is normally spatially separated by a relatively large distance from the capstan, and because of the spring-mass, the skew and flutter specifications are frequently less than desirable for the more demanding types of recording instruments.

In the zero-loop configuration the tape lays on the capstan and the heads are located in close proximity with the tape portion which is supported by the capstan. Such systems have the problem of tape head interface instability and excessive wear of the heads by reason of the tape/capstan contact with the head.

SUMMARY OF THE INVENTION

Briefly, this invention is directed to modifications in the tape transport drive system designed to overcome the aforesaid problems characterized by a short loop transport for use in association with a tape supply source, a transducer and a tape take-up source having first and second drum members that each have tape carrying surfaces and friction drive surfaces and are rotatably mounted on laterally spaced, substantially coplanar axes in the proximity of the transducer. A power driven capstan is associated with and between the drums. The drive axis of the capstan is substantially parallel to the axes of the drum members whereby the drive surface of the capstan is engageable with the drive surfaces of the drums for transport of the tape from a supply source around the tape carrying surface of one drum into operable contact with a transducer and around the tape carrying surface of the drum to the take-up source. The drive axis of the capstan may be off-set from the plane of the axis of the drums or spaced on a side of the plane of the axes of the drums, either toward or away from the transducer.

Also, in one embodiment, the axes of rotation of the drums are pivotally mounted whereby to move their centers of rotation, on command through power means, away from the transducer and away from the center of rotation of the capstan to define an idle mode and remove the tape from operable contact with the transducer, or, to move their axes from the idle mode to a position further away from the transducer with their frictional surfaces again in contact with the drive surface of the capstan in a transport mode.

These embodiments of the invention provide a wide variation in available tape speeds, start and stop times, and bi-directional fast mode operation in the order of 320 inch per second (*ips*) with the tape lifted from the transducer heads. The tape transport structure allows flutter control of from 0.05% pp at high speed to 0.40% pp at low speeds with dynamic skew ratings of plus or minus 0.5 micro-seconds across 1 inch at 120 ips to plus or minus 50 micro-seconds across 1 inch at 15/16 ips. When used with vacuum column tensioning, the system accommodates tape having 14 to 56 tracks per inch.

These characteristics are further accomplished by employing a pair of drums mounted on motor-driven crank or eccentric shafts, the operation of which moves their axes of rotation in a small arc on each side of a central driven capstan so that the drums engage the capstan on a side away from the transducers for lift (fast forward or fast reverse) operation and on a side toward and in contact with the transducers for record or play operation. The crank axles of the drums are normally in a neutral position (defined as any position where drums do not contact puck) intermediate the aforesaid dual position points with the capstan when the system is at idle or during shut-off. In the idle mode the tape span is barely out of contact with the head assembly. The crank axles of the drums move in a 180° arc, a total angle of about 4° each side of the center line or plane that includes the axes of the drums in idle position and the center of rotation of the capstan.

The eccentric axes of the drums carrying the span of tape are rotated sequentially by individual reversible DC torque-type motors. With power on, pushing the fast forward button starts accelerating the capstan motor to the fast forward speed of 320 ips. The capstan begins rotating, but the eccentric axes carrying the drums are still in the idle position and are not in contact with the capstan. Simultaneously, the DC torque motor for one of the drums is actuated, rotating the associated eccentric shaft, and that drum is rapidly pivoted from the idle position into contact with the capstan. This control drum includes means to actuate a normally-open micro-switch as the eccentric shaft reaches the end of its arcuate swing to start the DC torque motor for the second eccentric shaft, thus moving the second drum into contact with the capstan.

When the fast reverse button on the control panel is pushed, the same sequence of events takes place except that the capstan motor is driven in the reverse direction and the drums are driven to re-wind the tape on the supply reel. Both the supply and take-up reels have their individual directional and speed synchronized drive motors to coordinate the travel of the tape.

By pushing the "read" or "record" button, the capstan drive motor starts to accelerate to the selected speed and the DC torque motor driving the eccentric shaft or crank of the control drum is accuated simultaneously in the reverse direction and that drum is rapidly pivoted from the idle position into contact with the rotating capstan, toward the transducer assembly. This moves the tape into operable contact with the transducer assembly. A second microswitch is actuated at the end of the short arc of reverse travel and the DC torque drive motor for the second eccentric shaft is actuated. This moves the second drum from idle position into contact with the capstan. The drums will engage the capstan in approximately 0.1 second, and in about 6 seconds, the tape will accelerate if the selected speed is 240 ips.

The drums move or pivot in a manner such that the tape approaches and contacts the transducers sequentially in either direction of tape travel. Means are also included to accurately adjust the limits of arcuate travel of both crank axles, maintain their crank motors in constantly geared relationship at all times and also to cushion the contact of the switch actuation means.

The gear assembly for the axially-spaced tape-carrying drums is constantly meshed during the arcuate swing of the crank axles and the crank drive function is smooth without mechanical shock to the system.

DESCRIPTION OF ILLUSTRATIVE EMBODIMENTS

Figure 1:
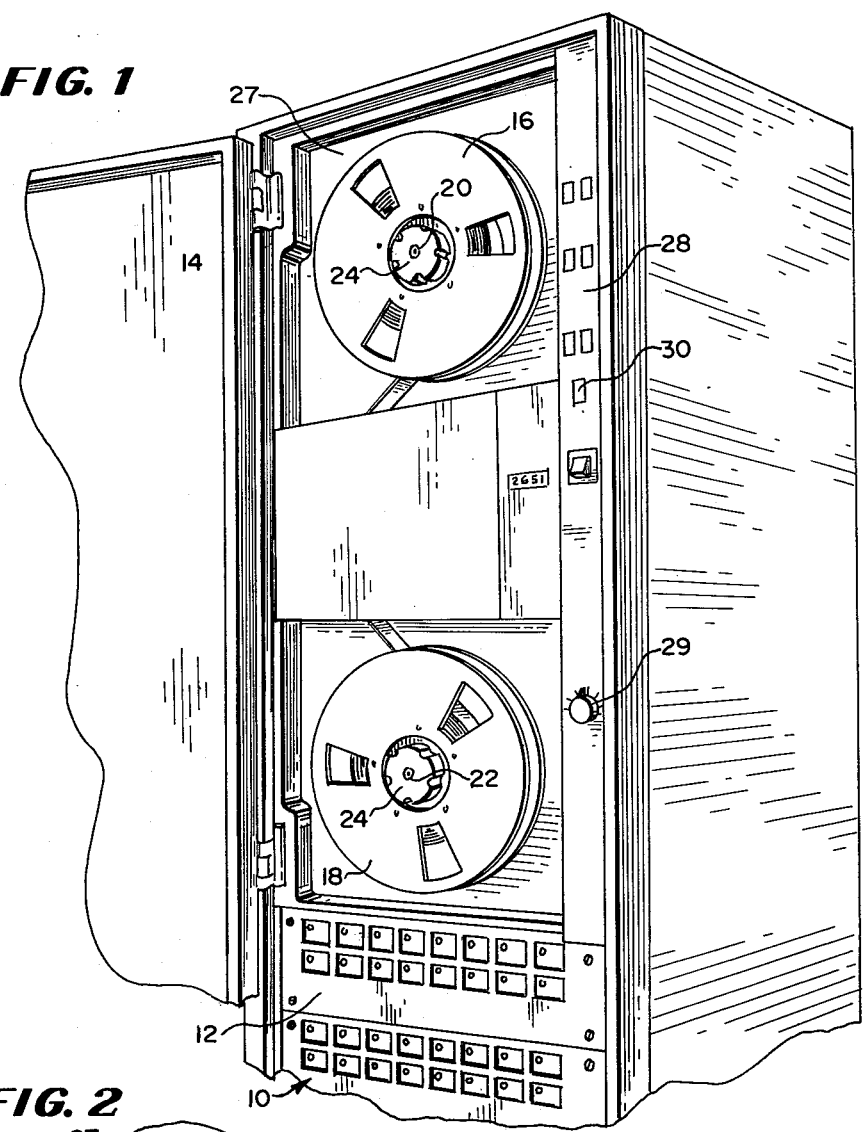
FIG. 1 is a perspective view of a transport unit showing the general relationship of the supply and take-up systems, and the control panel.

Referring to FIG. 1 there is shown an upright cabinet 10 having a front panel 12 at the bottom and hinged glass front panel door 14 covering the top supply reel 16 and bottom take-up reel 18 mounted on their respective spindles 20 and 22. Each reel has a non-detachable hub lock 24 adapted to be turned 20° to lock. The glass door 14 also covers the transport system 26 (See FIG. 2) located between the reels on the recessed front plate 27 of the cabinet.

On the right side of the cabinet there is provided a readily accessible control panel 28 to include the necessary individual control switches, illustrated at 29, and push buttons, illustrated at 30, to perform, control or indicate through integrated circuitry, such functions as power, forward, reverse, stop, record, fast forward, fast reverse, end of tape, to data, shuttle, search, mode select, tape speeds, tape footage count, monitor/alarm, and the like.

Figure 2:
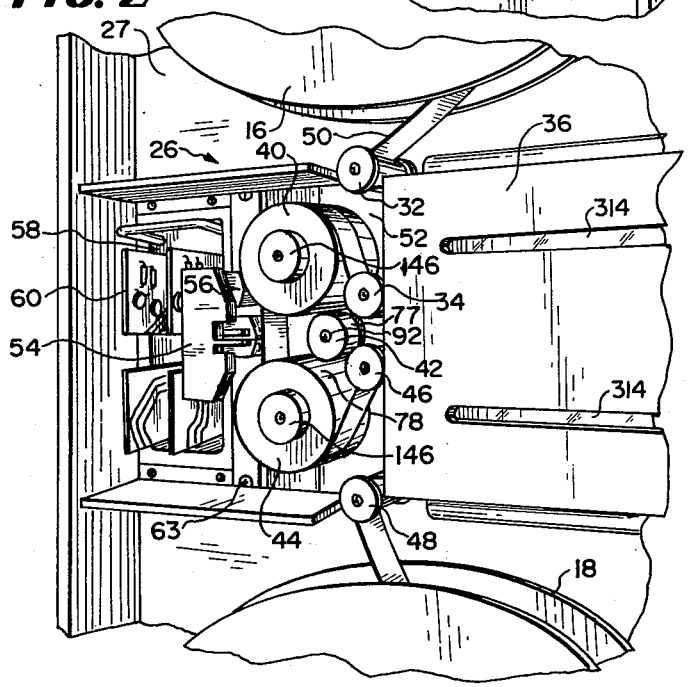
FIG. 2 is an enlarged perspective view of the transport system with a tape threaded therethrough.

In FIG. 2 the transport system 26 is shown to include the top pair of guide rollers 32 and 34 spanning the side opening of a first vacuum chamber (to be described) covered by the hinged side plate 36, the first drum 40, the drive capstan 42, the second drum 44 (identical in construction with the first drum 40) and the second pair of guide rollers 46 and 48 (which are identical with the rollers 32 and 34) spanning the side opening of a second vacuum chamber behind the hinged cover plate 36.

The path of the tape 50 is clearly indicated to be from the feed or supply reel 16 over the roller 32 into the first vacuum chamber, from this chamber over the roller 34, then around the drums 40 and 44 in major wrapping engagement, over the roller 46, through the second vacuum chamber, over the roller 48 and thence to the take-up reel 18. Because of the relatively close spacing of the drums 40 and 44 with each other and the capstan 42 and the absence of idlers, the transport system qualifies as a short-loop configuration. The vacuum chambers perform the functions of tape-guiding, adding tape tension, providing an indicator in the event the tape becomes tight or loose within certain limits, and serve as a tape storage element, thereby buffering the capstan block assembly 52 from the reels 16 and 18.

As will be described, the drums 40 and 44 are rotatably mounted on crank shafts suitably carried by precision bearings within the capstan and head mounting block 52 for transport of the tape 50 into operable contact with the transducer assembly 54 (the read/-record or simply "read" position), the individual transducers 56 of which perform the necessary record and play functions, known in this art. The connector plate 58 provides a convenient receptacle for the various preamps 60 connected to the play heads making up that part of the electrical circuits required to interface the transducer assembly 54.

Figure 3:
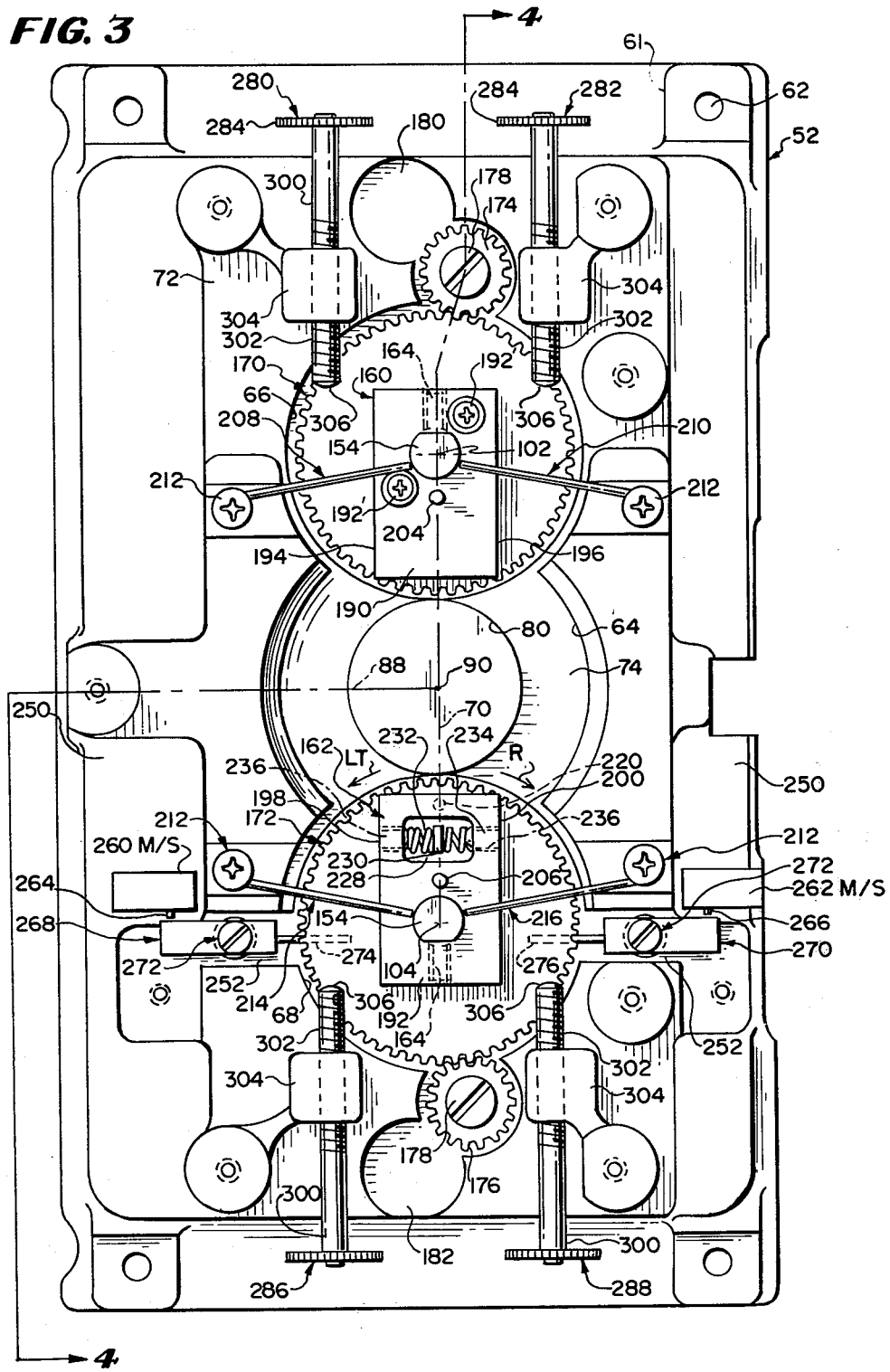
FIG. 3 is a plan view of the back side of the assembly of FIG. 2 to show the eccentric control means, associated DC torque motors for the shafts being omitted for simplicity.

Referring to FIG. 3, the back side of the mounting block 52 is shown with the drive capstan 42 removed. The block 52 is an aluminum alloy casting having suitable mounting bosses 61 with mounting holes 62 for attachment to the front side of the recessed front plate 27 of the cabinet, indicated by the machine screws 63 (FIG. 1). The block 52 has a central circular recess 64 intersected diametrically by the top circular recess 66 on one side and the bottom circular recess 68 on the other side of the center line 70 which, as is illustrated, passes through the respective centers of all three recesses. The recesses need not be circular in form as long as they perform the function of housing the gear system and capstan with their respective bearings (to be described) in a particular geometric relationship. The recesses are bounded by the generally planar back surface 72 of the block 52 while the generally planar front surface 74 (FIG. 3) is raised therefrom and also shown in FIG. 4 by the same numeral.

Figure 4:
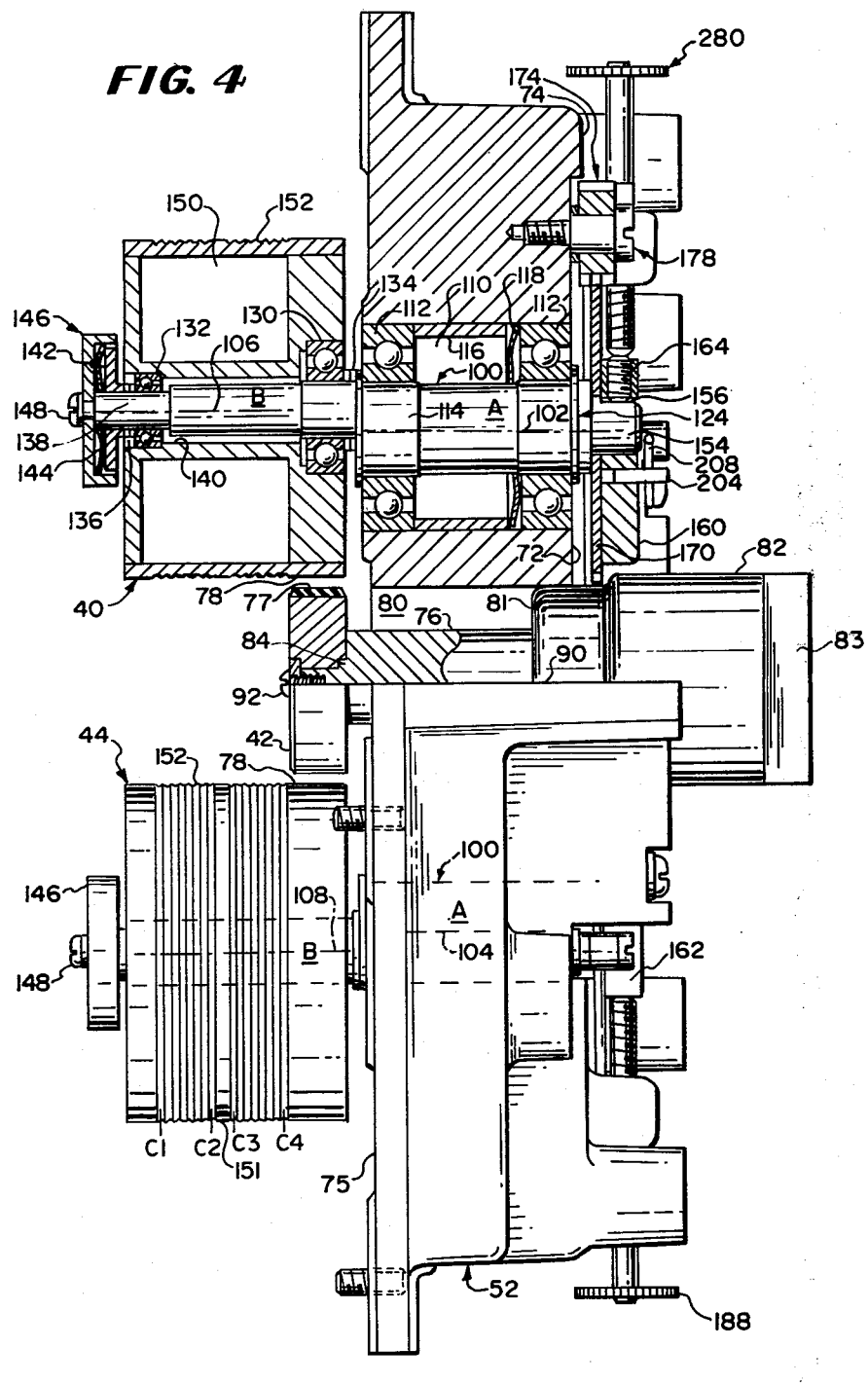
FIG. 4 is a partial cross-section taken along the lines 4—4 of FIG. 3.

Referring momentarily to FIG. 4 in relation to FIG. 3 the drive capstan 42 extends from its supporting drive shaft 76 above the front surface 75 of the block 52 to a position between the drums 40 and 44 so that its outer puck surface 77 is substantially diametrically between and spaced from the outer bottom friction surface portions 78 of both of the drums in the idle or shut-off position.

The puck 77 is preferably composed of a tough thermoset such as certain grades of cast liquid polyurethane having high abrasion and impact resistance and is carefully cast to the periphery of the capstan 42 composed of titanium metal to which it adheres very tenaciously. Following the casting operation the capstan is placed in a lathe and the outer surface turned to a smooth and exceedingly true cylindrical form, and the edges are chamfered. This plastic surface and its careful preparation are important to the positive and smooth performance of the capstan as a trouble-free friction drive. Polyurethane is used for this purpose because its characteristics of moldability, machinability, stiffness (elasticity or resilience), durometer and coefficient of friction.

A preferred polyurethane resin comprises a ricinoleate urethane as supplied by NL Industries of Heightstown, New Jersey, under the trade designation "NL88" having a Shore Hardness of 50 D. The puck 77 is applied in a single layer thickness build-up in the radius of the capstan 42 and will have a thickness of about 0.035 inch.

The opening 80 in the block 52 is slightly larger in diameter than the capstan 42 and houses the shaft 76 which is rotatably carried by the bearing housing 81 and driven by the motor 82 with the tachometer 83 carried at the end. The bearing housing 81 has an outer machine surface that extends into the opening 80 and this arrangement is used to locate the puck 77 in relation to the drums 40 and 44.

The fixed rotational center 90 of the drive shaft 76 for the capstan 42 is shown in both FIGS. 3 and 4. The capstan is centered on the shaft 76 by the locating boss 84 and affixed by means of the machine screw 92. The motor, bearing, drive shaft and capstan assembly can be inserted into the position shown in FIG. 4 as a unit, since the capstan clears the bore 80. A suitable three-point machine screw mounting (not illustrated) between the inner end of the motor housing and the block 52 holds the capstan and its drive system in place.

Figure 6:
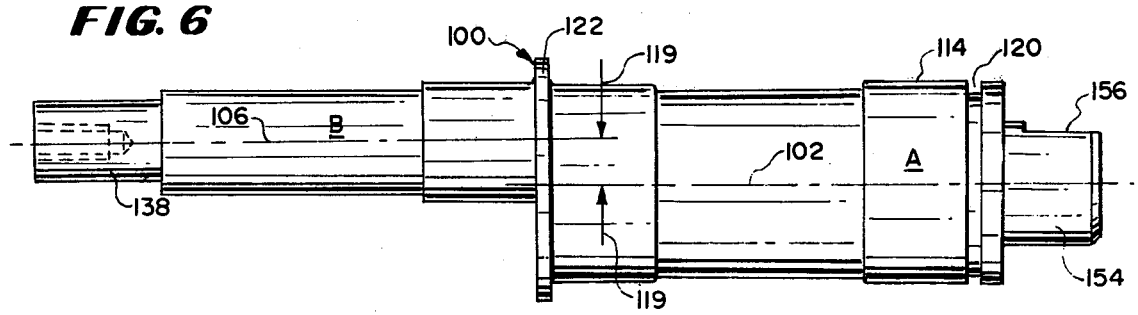
FIG. 6 is a side perspective view illustrating a crank shaft or eccentric for mounting the drums of the transport assembly.
Figure 7:
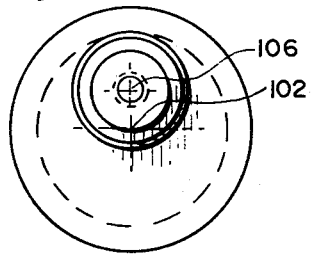
FIG. 7 is a plan view of the crank end of the shaft of FIG. 6 upon which a drum is rotatably mounted.
Figure 8:
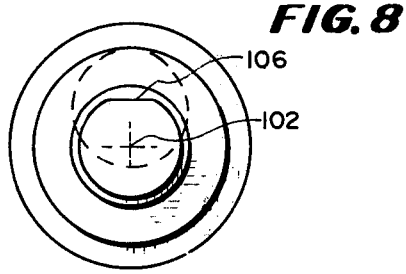
FIG. 8 is a plan view of the opposite end of the shaft of FIG. 6 which is rotatably mounted on a fixed axis within the block support of the transport assembly.
Figure 9:
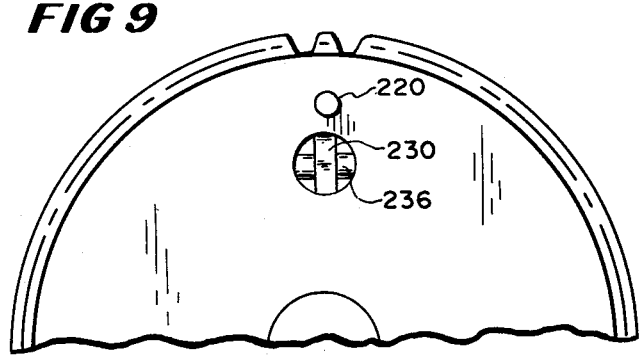
FIG. 9 is a fragmentary top plan view of the control gear of FIG. 3 to show the spring post extending from the upper surface.
Figure 10:
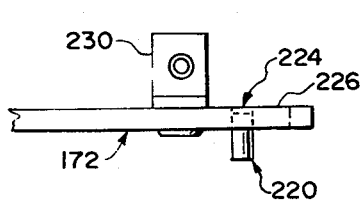
FIG. 10 is a fragmentary side view of the control gear part shown in FIG. 9.
Figure 11:
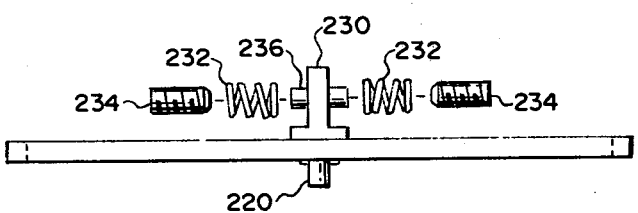
FIG. 11 is a plan view of the side of the control gear with the springs and adjustable screw seats therefor shown in exploded relationship.

Each of the drums 40 and 44 is mounted on an identical shaft 100, shown in detail in FIGS. 6, 7 and 8, and in the cross-sectioned portion of FIG. 4 for the drum 40. These shafts each have a fixed axial portion A and a movable portion "B." The axes of portions A and B are offset. The center lines of rotation of the respective A portions of the shafts are shown at 102 and 104 in FIGS. 3 and 4, and, B portions are shown at 106 and 108. The portions B pivot about the same axes as portions A, i.e., axes 102 and 104. The portions B are the rotational axes for drums 40 and 44.

Referring more specifically to FIG. 4, and using the shaft 100 for the drum 40 to illustrate the manner in which both of these shafts are mounted, it is seen that the housing 52 defines an opening 110 for the pair of precision bearings 112, the inner races of which engage the raised machined and true surfaces 114 of the fixed axial portion A. The bearings are held in axially-spaced position by the spacer ring or collar 116 having a width less than the axial distance between the outer races of the bearings to accommodate the spring loading wavy washer 118. This washer can be on either side of the ring 116. These parts define the fixed rotational axis 102 about which the rotational portion B, axis 106 turns or pivots.

At one end of the shaft 100 (Refer to FIG. 6) a circumferential groove 120, and, at its approximate midpoint, the circumferential shoulder 122 are provided. The shaft 100 is assembled into the bearings so that the shoulder 122 rests against the inner race of one bearing and an external retaining ring 124 engages the groove 120 in a snap-fit as a slight compression force is placed on the wavy washer 118 (FIG. 4).

The drum 40 is carried on the crank portion (spindle 138, FIG. 4) B of the shaft 100 by means of the smaller bearings 130 and 132, the inner race of the former seating against one or more flat shim washers 134 and the inner race of the latter also seating against similar shim washers 136, of smaller diameter due to the reduced end 138 of the shaft. This bearing assembly is retained within the central bore 140 of the drum 40. The assembly, at this spindle end 138 of the shaft, is completed by the bearing retainer 142, a second wavy washer 144 and the cap 146 held in place by the machine screw 148.

In order to maintain the proper mechanical relationship between these movable and rotating parts, the radial off-set or crank axle length between the centers 102 and 106, and 104 and 108, of the shafts 100, as indicated between the arrows 119 in FIG. 6, is about 0.125 inch. The distance between the crank centers 102 and 104 of the shafts 100 is about 3.396 inches; the drum diameters are about 2.25 inches; and the capstan diameter, including the puck, is about 1.1459 inches.

The drums 40 and 44 are low mass and for this purpose are hollow as indicated by the internal space 150. The outer surfaces of the drums also provide a tape-carrying surface having a plurality of close-spaced circumferential shallow grooves 152 which eliminate air-bearing of the tape to the drums during fast forward and fast reverse operations. The grooves 152 are shaped, sized and spaced to be particularly suited for this function and to prevent tape damage as well as provide a proper tape-bearing surface for both 1 inch and ½ inch tapes. To accomplish the latter purpose a middle circumferential section 151 without grooves is shown in FIG. 4 to divide the plurality of grooves into two parts so that a 1 inch tape will span all of the grooves in the two portions, but a ½ inch tape will span only the grooves of one portion with an outer edge of the tape running along the center portion of section 151.

To accomplish the former purposes each part on each side of the center portion 151 contains 9 grooves which are each essentially half-circles. Each groove is about 0.005 inch deep and about 0.01 inch wide. The center line distance between adjacent grooves is 0.05 inch. There being eight such spacings, the distance between $C^1$ to $C^2$ and $C^3$ to $C^4$ will be 0.40 inch and the distance between $C^2$ and $C^3$ (or the portion 151) will be 0.10 inch. These grooves are carefully machined in the tape carrying surface of the drums.

The number and placement of the grooves 152 insures that the edges of the tape 50 do not ride in or too near the groove edge which condition would cause edge damage to the tape and possibly skew. Tape interchange is thereby possible without the edges riding in the grooves. Also, the relation of depth to width was found to reduce the sharp edge at the boundary of the grooves and, in addition, there are fewer burrs to remove during construction.

At the other ends the shafts 100 have the reduced-diameter end portions 154 containing a flat portion 156 for the purpose of receiving the control blocks or rectangular hubs 160 and 162 held in place by the socket-head set screws 164. The blocks 160 and 162 hold the driven gears 170 and 172 on the respective shafts 100 for limited rotation about the axes 102 and 104, respectively.

Referring to the cross-sectional portion of FIG. 4 and the bottom and top portions of FIG. 3, it is seen that each of these driven gears 170 and 172 has an associated drive gear 174 and 176 meshing therewith. The gears 170 and 172 are preferrably of equal diameters, and, with one exception to be described, the drive gears 174 and 176 are also identical and of equal diameters so as to be interchangeable and simplify manufacture, as well as the choice of motor drive ratios therefore.

The drive gears 174 and 176 are held to their driven axes by means of the shoulder screws 178. The motor drive gears for these respective driven gears are represented at 180 and 182, and, for simplicity, the motors therefore are not shown. However, these motor drives are of the reversible DC torque type such as manufactured by Sequential Information Systems, Inc. of Elmsford, New York.

The control blocks or hubs 160 and 162 are mounted off-center to their respective shaft ends 154 of the crank shafts 100 and have their pendant or swing ends 190 and 192 extending radially to a position near the gear teeth of the gears 170 and 172. The hub 160 is against the surface of the gear 170, held thereto by means of the machine screws 192′ and to the shaft portion 154 by the set screw 164. There is no interference with the drive function of the gear 170. The oscillations of these gears are little more than 180°, and the drive gears 174 and 176 do not approach the flat sides 194 and 196 of the top hub 160 or the flat sides 198 and 200 of the bottom hub 162.

The pendant end 190 of hub 160 carries the protruding pin 204 and the pendant end 192 of the hub 162 carries the protruding pin 206, both of which face upwardly in FIG. 3 and the former is shown extending to the right in the cross-sectional portion of FIG. 4.

A pair of radially directed steel return-springs 208 and 210 is provided in relation to the top control hub 160, each extending over the gear 170 at slight angles to each other in a common plane with the pin 204. As the gear 170 is rotated about 90° in either direction from its intermediate or idle position shown in FIG. 3, under the indirect control of the gear 172, the pin deflects the ends of the springs 208 and 210 and stops when surfaces 194 and 196 contact stop 306.

The springs 208 and 210 are held to the block 52 by means of the machine screws 212 which provide not only a firm attachment but also a means of finite adjustment of the circumferential position of the springs about the axes of the screws. Each spring 208 and 210 has a loop or eye (not shown) around the shank of the screws.

The hub 162 is of a different construction, although it too is associated with a pair of return springs 214 and 216 of the same construction and mounting as the springs 208 and 210, likewise held by screws 212. As the hub 162 and the gear 172 are rotated, the springs 214 and 216 act as a cushion as hub surfaces 198 and 200 contact stop surfaces 306 (to be described).

The reason for springs 208, 210, 214 and 216 is to return drums 40 and 44 to idle position when power is removed from the drive motors operating the gears 180 and 182.

Referring to FIGS. 3, 9, 10 and 11, there is shown in more detail the pin or stake 220 carried on the underside and near the outer periphery of the lower gear 172, held partway within the bore hole 224 to insure an unobstructed interface at the surface 226 between the hub 162 and the gear 172. The hub 162 has the opening 228 which matches with the spring post 230 extending upwardly from the top surface gear 172. The opening 228 provides a housing for a pair of short compression springs 232, held at their outer ends by the set screws 234, carried in the end walls of the opening 228. The springs are seated on the roll pin 236 extending on each side from the spring post 230 and are held in coaxial relationship across the opening 228 in the hub 162. The spring post member 230 thus becomes an adjustable, resilient connection between the driven gear 172 and the hub 162 and its associated axle 154.

The stop pin 204 on the top gear 170, the pin 220 extending from the bottom of the bottom gear 172, the spring post 230 and the stop pin 206 are all on the center line 70 which passes through the two fixed rotational axes 102 and 104.

The lower assembly of the block 52 is formed with suitable recessed areas such as 250 on each side of and extending below or to the inside of the lower control gear 172, with channel openings 252 on each side communicating with the recess 68 housing the lower gear 172. A pair of normally-open micro-switches 260 and 262 are mounted within the outer recesses 250 with their actuators 264 and 266 extending in line with the channel openings 252 on each side of the lower gear 172. The channels 252 provide a protective recess for the switch blocks 268 and 270 pivotally mounted on the shoulder screws 272. The switch arms 274 and 276 of these switch blocks extend under or behind the gear 172 to a position engageable by the pin 220.

The micro-switches 260 and 262 control the electrical power to the reversible DC torque drive motor for the following or slave gear 170. The micro-switch 260 is activated (closed) by the contact of the pin 220 rotated in the direction of arrow R (standing for "read" or "record") with its switch arm 274 thereby pivoting the switch block 268 into contact with the actuator 264.

The micro-switch 262 is activated (closed) by the contact of the same pin 220 as it swings in the direction of the arrow LT (standing for "lift tape") into contact with the arm 276 of the switch block 270 which contacts its actuator 266.

The essential mechanical features of the assembly of the transport are completed by reference to the top of both FIGS. 3 and 4 which show the pair of adjusting screws 280 and 282 having serrated knobs 284 and by reference to the bottom of these FIGS. where the second pair of adjusting screws 286 and 288 are shown. The shank portions 300 of each adjusting screw include a threaded portion 302 engaging a threaded bore in the body of the block 52 or, as illustrated, carried in coplanar relationship by the bosses 304 so that their stop ends 306 extend above the top surfaces of the gears 170 and 172 in the plane of the respective hubs 160 and 162.

Thus positioned, the stop ends 306 of the adjusting screws are adapted to contact the respective side edges 194 and 196 or the side edges 198 and 200 of the associated hubs 160 and 162 at their pendant ends 190 and 192.

As the gears 170 and 172 oscillate through the cycles of record or play ("read"), to the fast forward and reverse ("transport") positions, the stop ends 306 of the adjusting screws function as limit stops at each end of the swing arc. By turning the serrated knobs, the stop ends 306 can be finitely adjusted to limit the swing arc of the respective hubs and hence control the degree of compression of the drums into polyurethane puck surface 77. Thus, the distances between the axis 90 of the capstan 42 and the peripheries of the drums 40, 44 along respective radial lines joining the axis 90 with the axes 106, 108 of the drums can be made equal, thereby insuring constant tangential velocity of the drums (and constant tape speed) because the drums are surface-driven by a common drive element, namely, the capstan.

Since the hub 160 is affixed to the gear 170 and the drive gears 180 and 174 are in constant engagement, when the stops 306 function to stop the hub 160 at the end of its swing, the motor drive therefore stalls. For this purpose a slip clutch or stall motor is used (which latter limits stall torque in stalled condition).

The overall operation of these parts is as follows:

Assume the gear 172 is driven in the "read" direction (CCW, i.e. counterclockwise, in FIG. 3) from idle position. The gear 172 rotates until the pin 206 contacts the spring 214 causing the spring to deflect (spring 214 does not limit rotation of gear 172). The gear 172 continues to rotate causing the pin 220 to engage the switch arm 274, of switch block 268, rotating the block 268 on the screw 272 toward the actuator 264 of the micro-switch 260. The gear 172 continues to rotate causing the surface 198 of hub 162 to contact the tip surface 306 of the stop 286. The hub 162 contacting the stop 286 limits rotation of the crank 100 and hence the drum 44 since the hub 162, crank 100 and drum 44 are all ridgidly connected.

At this point the drum 44 has engaged the puck 77 thereby compressing polyurethane surface to the required degree as set by adjustment of the stops 286.

The gear 172 continues to rotate CCW (with the hub 162 against the stop 286) allowed by resilient coupling means, i.e., the springs 232, causing the spring 232 on that side to begin compressing. The gear 172 continues rotating until the switch block 268 contacts the activator 264 causing switch 260 to switch and the drum 40 to be driven to its "read" position. Adjustment of set screw 234 determines how much further gear 172 must rotate, after the hub 162 contacts the stop 286, to cause the switch 260 to be activated and force of the block 268 against the activator 264.

The significant factors dictating design requirements of resilient coupling between hub 162 and gear 172 are:

1. The micro-switch 260 should be activated after the hub 162 strikes against the stop 286. This insures that the control drum 44 is driving the tape 50 before the slave drum 40 begins rotating; and 2. The adjustable means, the spring post 230, are provided to control the rotation when the micro-switch 260 is actuated.

It is apparent that the foregoing factors, movements and adjustments apply in reverse order when the controls are moved to call for the drums to move to the idle position and then to lift tape (LT) or transport position. As the torque on the gear 172 is released, the spring arm 214 causes the drum 44 to move to the idle position, the drive capstan keeps rotating, but the switch 260 opens and the drum 40 is returned to its idle position as the drum 44 stops rotating. Movement of the control drum to the lift tape (transport) position (CW in FIG. 3) causes the micro-switch 262 to be actuated after the hub 162 strikes against the stop 288, again assuring that the control drum 44 is driving the tape 50 before the slave drum 40 begins rotating.

Figure 5:
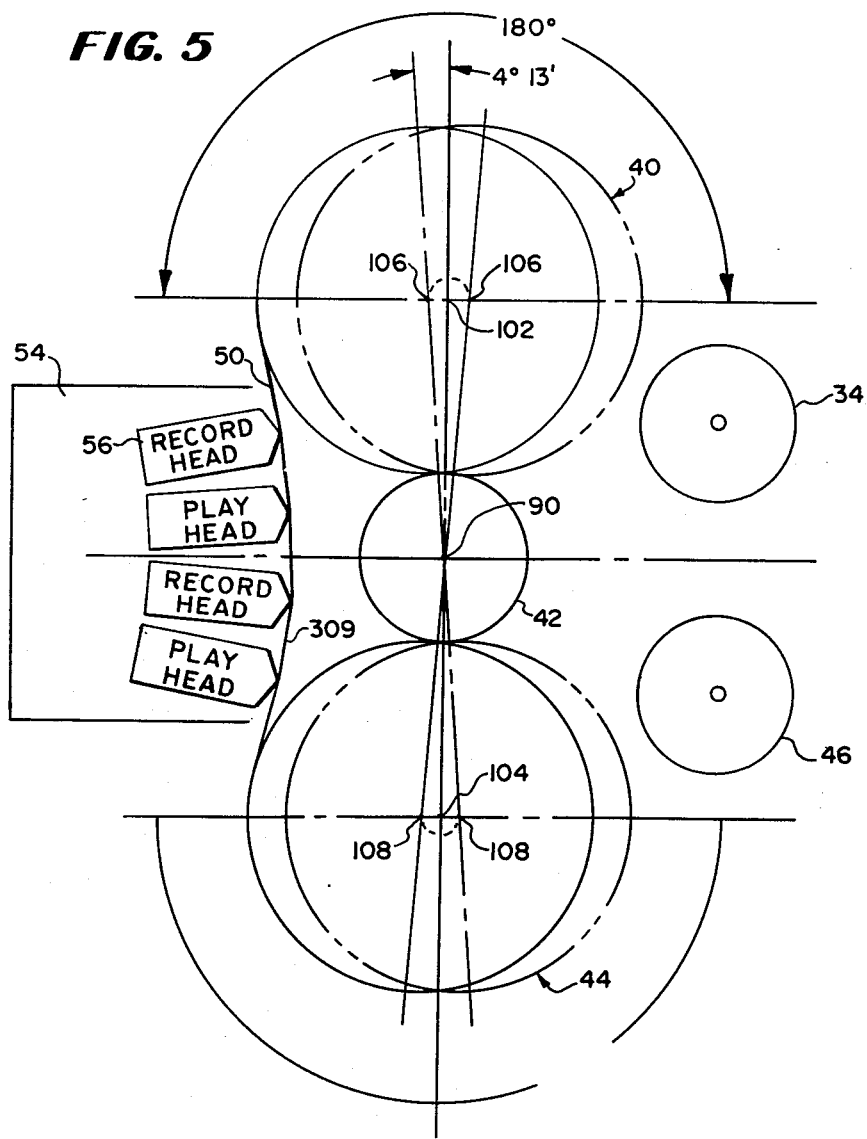
FIG. 5 is a diagrammatic plan view of the front side of the tape transport to illustrate the geometry of the idle, tape lift and tape read positions of the assembly in relation to the transducer head.
Figure 5A:
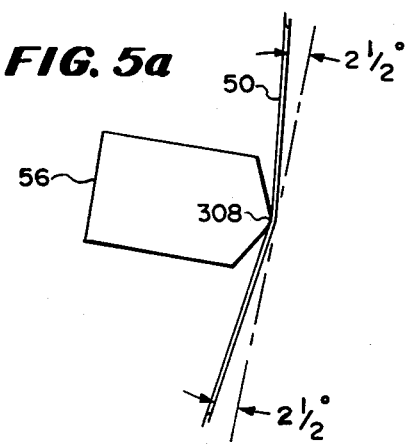
FIG. 5A is a diagrammatic view showing the relationship of a transducer crown in relation to the tape.

The relative movement of the eccentric axis 108 of the lower drum 44 to each side of the center 104 or idle position, toward and away from the transducer head assembly 54 and the relative following movement of the eccentric axis 106 of the upper drum 40 to each side of its center 102, toward and away from the transducer head assembly 54, as well as the relationship of the record and play heads 56 to the tape 50, are more clearly shown diagrammatically in FIGS. 5 and 5A. By these means the tape 50 passes in a short loop from the roller 34, in major wrapping engagement over the drums 40 and 44, past the transducers, back to roller 46 in the record or play mode and in a slightly shorter loop during the transport mode, since the drums 40 and 44 are closer to the rollers 34 and 46.

Although FIGS. 5 and 5A are self-explanatory, it is to be observed that the pivot axes 106 and 108 move in a short arc of about 4°13' in relation to the center of rotation 90 of the capstan 42. Also, as shown in FIG. 5A, when the drums are in the read position, the tape 50 enters and leaves the crown 308 of each head 56 with a 2 ½° wrap and the sections of tape 50, indicated at 309, travel in an essentially straight-line relationship on each side of the points of crown contact.

Figure 12:
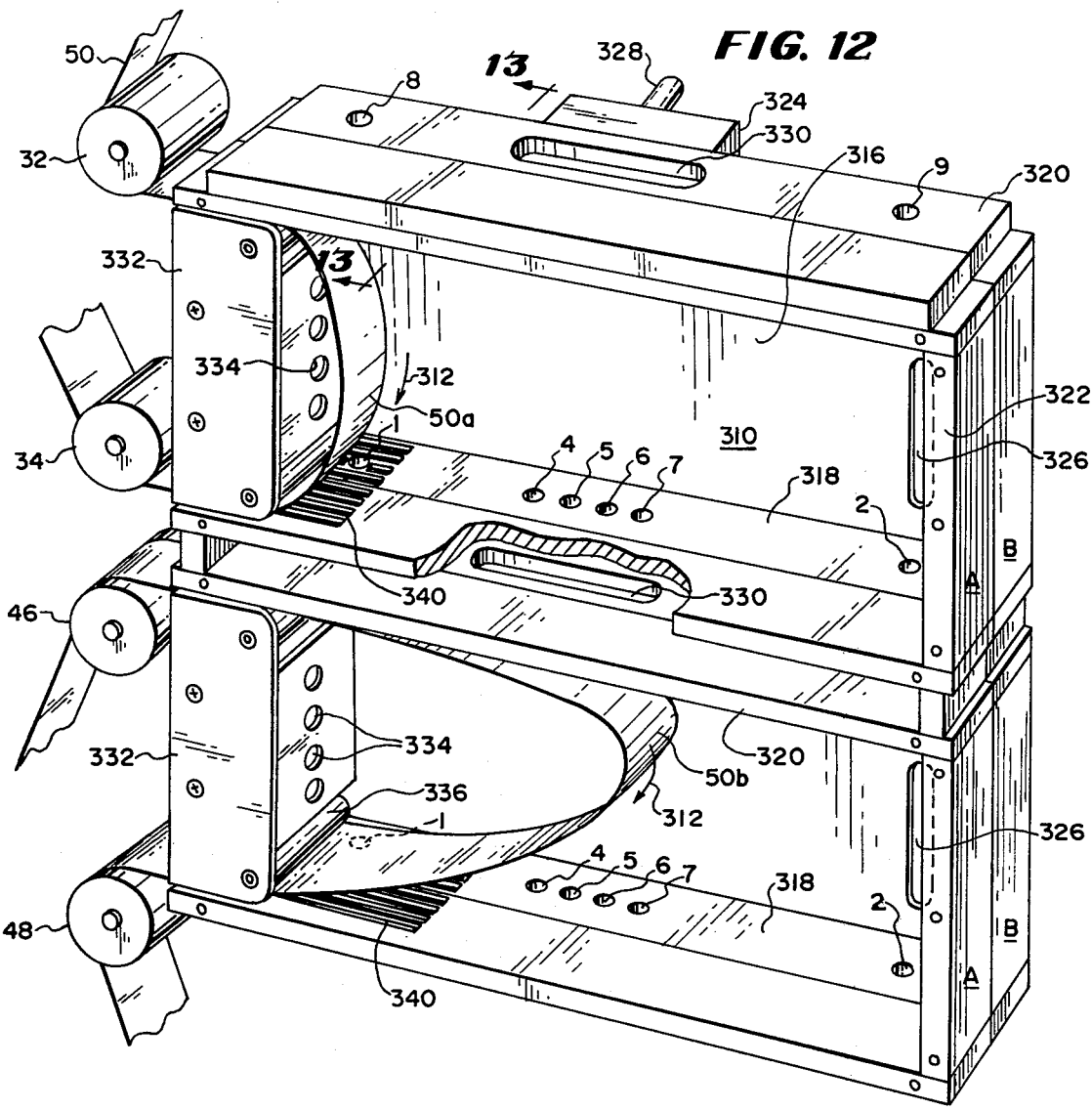
FIG. 12 is a perspective view of the pair of vacuum chambers with the hinged cover removed.
Figure 13:
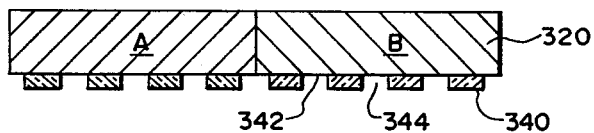
FIG. 13 is a cross-sectional view taken along the lines 13—13 of FIG. 12.

The reduction in flutter and skew, and the increase in fidelity is augmented by the close proximity of the pair of vacuum chambers 310, shown somewhat diagrammatically in FIG. 12. These chambers are identical in construction. The hinged cover plate 36 has been removed to show their interiors through which the tape 50 passes in the loops 50a and 50b in the direction of the arrows 312. The cover plate 36, incidently, includes a pair of elongated glass panels 314 (See FIG. 2) that extend centrally along the sides of the chambers 310 so that the progress and status of the tape loops 50a and 50b can be visually checked.

The cover plate 36 made of hardened aluminum defines a smooth planar side wall on one side of the loops of tape while the back wall 316 also made of hardened aluminum defines a second smooth planar side wall on the other side of the loops of tape. The bottom panels 318 and the top panels 320 are likewise free of burrs, being made of aluminum alloy, on their inside surfaces, covered with low co-efficient of friction adhesive-backed tape material, form part of the enclosure and the respective end or bottom panels 322 form an essentially air-tight seal against the cover plate 36 in its closed position.

A pair of slots 326 communicate the interiors of the chambers with the plenum 324 mounted on the back side of the vacuum chamber against the walls 316. The plenum has a suitable nozzle 328 which connects by means of flexible conduits (not shown) to a common and essentially constant source of partial vacuum. The vacuum is generated by a multi-stage fan type pump driven by an electric motor, not illustrated.

The panels 318, 320 and 322 are divided into longitudinal sections A and B. The sections B house the series of light sources 1 and 2 such as light-emitting diodes at their ends and the closely spaced group of light sources labelled 4-5-6-7 (also light-emitting diodes) located intermediate the ends of the chambers 310. The top panels 320 for each chamber include in their sections B the photosensitive units or photo-cells 8 and 9, these parts being hidden for the lower most of the panels by the proximity of the bottom panel 318 of the top chamber. The photo-cells 8 and 9 for each chamber are opposite and responsive to the light sources 1 and 2.

The sections B of the panels 320 also house a series of inter-connected photo-cells behind appropriate glass panels, the series being indicated by the reference numeral 330. The photo-electric system just described is connected through suitable amplifiers to control the reel drive motors, as will be described.

The chambers 310 each have an air flow distribution shoe 332 forming a partial closure and guide for the incoming and outgoing tape 50. These shoes have their top and bottom ends closely spaced from the interior surfaces of the respective top and bottom panels 318 and 320 for each chamber 310 to provide a slit for entry and exit of the tape 50. These slits are about 1 inch long and about 0.05 inch in depth or thickness in order to accommodate the tape 50 while preventing the tape from fluttering in the slit. All surfaces that contact the tape are obviously free of burrs to prevent damage to the tape.

The shoes 332 define a series of uniformly sized and spaced air openings 334 which are open to the atmosphere on the side toward the rollers 32 and 34, and 46 and 48. At the top and bottom of each shoe a transverse roller 336 is provided to facilitate the passage of the tape therearound, especially under conditions of lessened tape tension.

In order to insure the free substantially frictionless movement of the tape 50 in the chambers 310, the interior surfaces 342 of the panels 318 and 320 are covered with a tape 340, fastened by a pressure-sensitive adhesive, to provide a frictionless surface. At the ends of the tops and bottoms of both chambers the tape is cut to form the grooves 344 therein to augment the flow of atmospheric air on the outside of the tape to form the loops 50a and 50b. This prevents the adherence of the tape to the inner surfaces of the top and bottom panels due to the incoming air through the holes 334 that is forming the loops. Accordingly, the loops float or are cushioned by the flow of air on all sides. The vacuum chambers 310 also facilitate threading of the tape by facilitating the formation of the loops, with little attention by the operator. It is apparent that with this construction the vacuum chambers are assembled to accommodate 1 inch wide tape. By removing the section A and mounting a ½ inch wide shoe 332 in each chamber, it is ready to operate with ½ inch wide tape.

The tensioning system works as follows: a partial vacuum is drawn at the ducts 326, through the plenum 324, and the reel motors (illustrated at 404 in FIG. 14) begin to feed and take up the tape; air passes through the holes and also through the slits on each side of the tape at the ends of the shoes 332; the loops 50a and 50b gradually form, due to the in-rush of air; and the tape shuts out the passage of light from the source 1 to the photo-cell 8 as indicated by the normal operating position of the loop 50b in the lower chamber.

When the system is at the selected speed the ends of each loop will be opposite the light sources 4 – 7 and the photo detectors 330 will monitor this normal condition. If the loop in either chamber becomes too short, as indicated by the loop 50a in the top chamber, the photo system 4 – 7 and 330 will give a visual signal and proper adjustment of the speed of the supply reel will take place. In the event the loop assumes the shortened condition of loop 50a, allowing the photo-cell 8 to be actuated, the recorder shuts off. In the event either loop reaches a point opposite the light sources 2, the photo-cells 9 are actuated and the recorder is again shut off. The elongated windows 314, in the front panel 36, allow visual observation of all conditions of the tape loops.

The edges of the loops of tape 50 are finitely spaced from the sides 316 and the inside of the front panel 36. These spaces are automatically equalized in width since the natural air flow will be equal on both sides of the tape. This causes the tape loops to be centered in the chambers 310 and also travel in a straight line for proper registry with the rollers and drums. Skew is therefore at a minimum.

Figure 14:
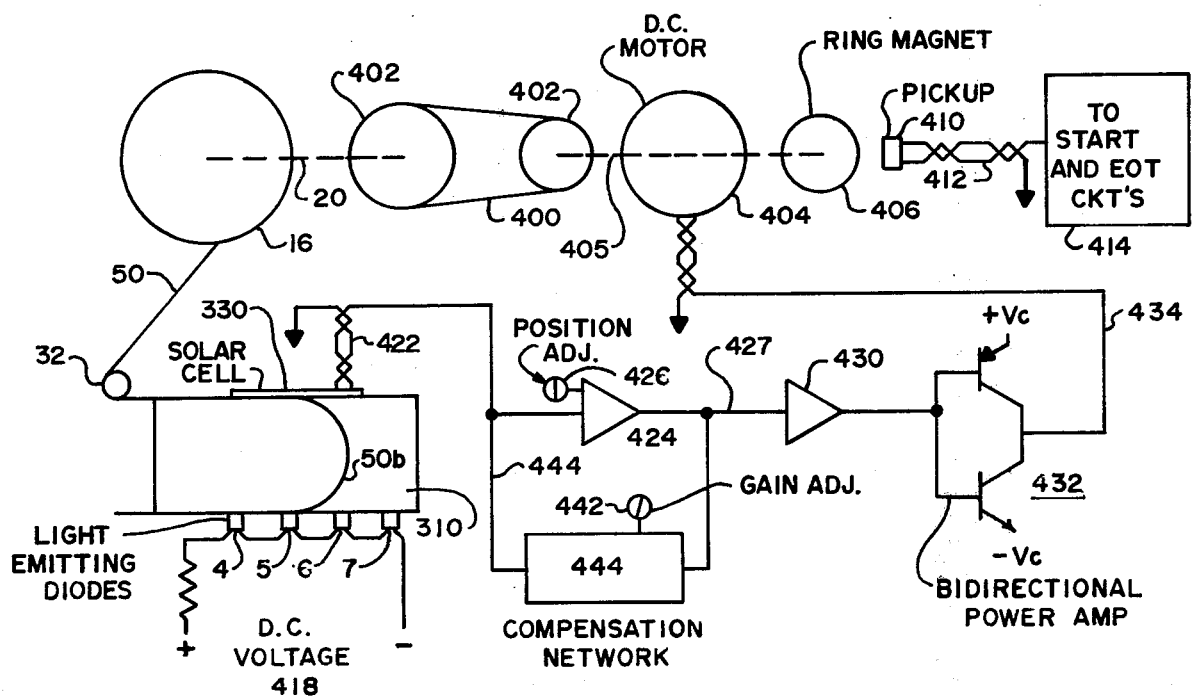
FIG. 14 is a diagram showing the reel drive system.

FIG. 14 is a diagrammatic representation of the reel drive control system that is used in conjunction with the short loop transport system just described, wherein parts corresponding to the previous FIGS. bear the same reference numerals. The reel 16 is shown with its belt drive 400 operating from the pair of pulleys on the shaft 20. One pulley 402 is connected to the DC motor 404 via its shaft 405. A disc or ring 406 having an outer edge or periphery that is magnetized with alternate areas of opposite polarity is attached to the other end of the motor shaft 405. A magnetic pickup 410 is connected by leads 412 to the starter and end-of-tape circuits 414.

The tape 50 passes over the roller 32 to the basket or chamber 310 of the vacuum chamber and forms the loop 50b therein. A wall of the chamber includes the light-emitting diodes powered by the DC circuit 418. An opposite wall of the chamber also facing the flat side of the tape loop 50b holds the solar cell unit 330. The DC pickup 422 is connected from the solar cell unit to a preamplifier 424 having a position adjust means 426 via the lead 427 to the driver 430, thence to the bi-directional power amplifier 432, and by the lead 434 to the DC motor 404. A compensator network 440 with its gain adjust means 442 is connected across the preamplifier 424 through the lead 444.

During operation the amount of light passing from the diodes 4, 5, 6 and 7 that reaches the solar cell 330 is a function of how far the tape loop 50b extends into the basket 310, i.e., how many diodes are interrupted. The output of the solar cell 330 is a DC voltage that is proportional to the distance that the tape loop 50b extends into the basket. This DC signal is fed through the preamplifier 424, the driver 430 and the bi-directional power amplifier 432 to the lead 434 to the DC motor 404 controlling the tape reel 16. After a disturbance, as a lengthening or shortening of the loop 50b, the motor 404 will rotate faster in one direction or the other until the tape reaches a pre-selected null or rest position in the basket.

An adjustment of the preamplifier 424 through the adjust means 426 allows this null point or selected rest position to be placed at the desired location in the basket. The compensation network 440, in the preamplifier circuit, controls the response or sensitivity of the reel drive system to transient disturbances of the tape loop 50b. The pick-up 410 detects the polarity of the changes in the ring magnet 406 as the motor 404 turns and generates pulses which are fed to the start-up circuits and end of tape sensing circuits 414.

Figure 15:
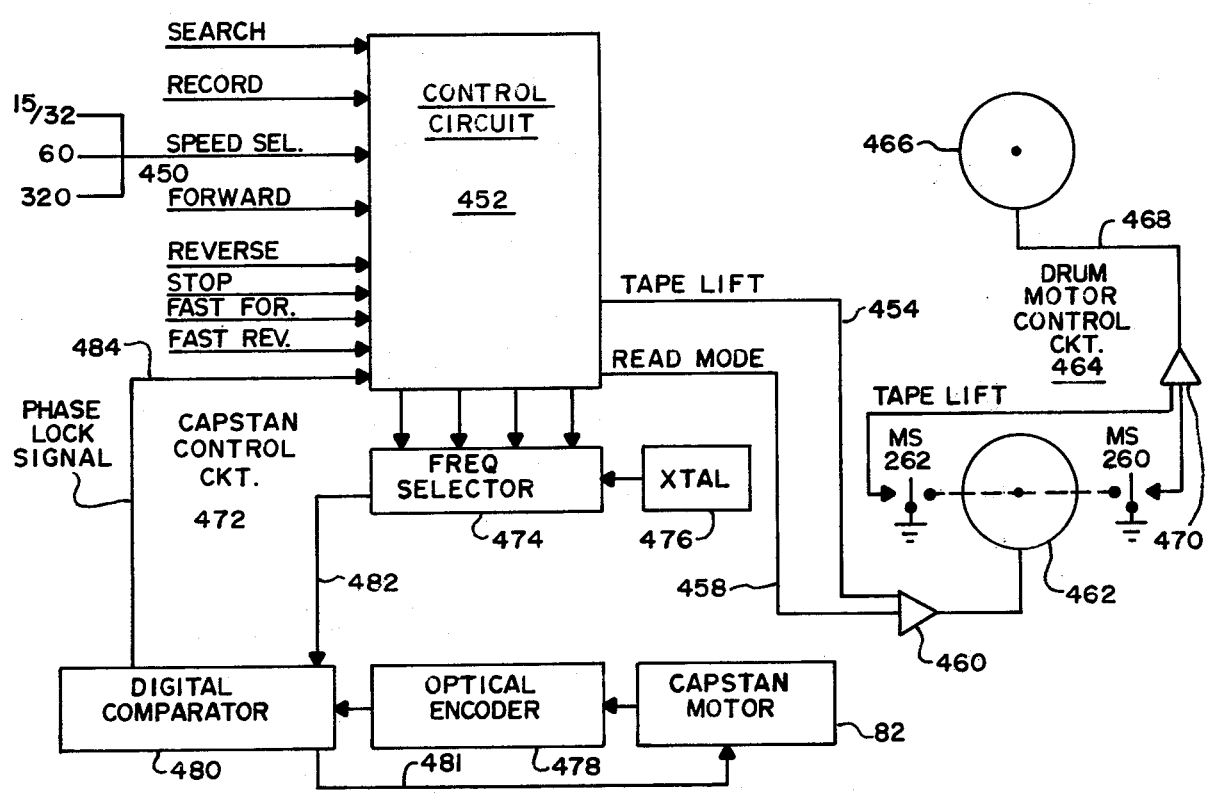
FIG. 15 is a diagram of the micro-processor control of the drum motor and capstan circuits.

The control panel 28 of the recorder 10 includes controls for effecting ten possible play speed selections, which speeds extend from a 15/32 sec. ips through 240 ips. These are indicated diagrammatically in FIG. 15 by the speed selector input 450 for a control circuit 452. The control panel also includes inter alia a "record" selector, a "forward" selector, a "reverse" selector, a "stop" selector, a "search" selector, a "fast forward" selector and a "fast reverse" selector represented by the legends at the side of the control circuit 452. The tape recorder 10 will operate in the play mode whenever the forward selector or reverse selector is operated alone. If the record selector is operated with the forward or reverse selector, the recorder operates in the record mode with the tape against the transducers. If speeds 15/32 ips through 240 ips are selected, the tape recorder 10 operates in the read mode. If the fast forward or fast reverse speeds of 320 ips are selected with the search switch operated, the recorder operates in the read mode. If the fast forward or fast reverse speed selector is operated alone, the recorder operates in the tape lift mode.

Briefly, the main components of the control circuit for the drum and capstan motors includes the tape lift conductor 454, the read mode conductor 458 and the bi-directional driver 460 which provides different polarity outputs to effect rotation of the motor 462 for the lower control drum 44 in correspondingly different directions. The contacts for the micro-switch 260 and the contacts for the micro-switch 262 are within drum motor control 464 which controls the upper drum motor 466 through the conductor 468 and power amplifier 470.

The control circuit 452 connects to the capstan control circuit 472 through the frequency selector 474 receiving the output from the crystal oscillator 476. The circuit 472 includes the capstan drive motor 82 connected to the optical encoder 478, the output of which goes to the digital comparator 480, which also receives the output of the frequency selector 474 through conductor 482. Lastly, the digital comparator 480 feeds its phase lock signal over conductor 484 back to the control circuit 452 and sends a phase difference signal via conductor 481 to the motor 82.

Assuming the operator wants to operate the recorder in the forward direction in the play mode at 60 ips, the 60 ips speed control input 450 is operated along with the forward selector. With such selection, the control circuit 452 outputs a signal to the capstan control circuit 472 to operate the capstan 42 through its drive motor 82 at 15/32 ips.

When the capstan motor arrives at the selected speed of 15/32 ips, a phase lock signal 484 indicating such condition is fed back to the control circuit 452. At such point, the control circuit 452 outputs a further signal to the capstan control circuit 472 instructing the capstan motor 82 to operate at 60 ips (the speed selected in the present example). At the same time, since the operating speed is 60 ips, the control circuit 452 applies a signal over the "read mode" conductor 458 and the power amplifier 460 to the lower drum motor 462 to cause the same to rotate in a direction to move the lower control drum 44 into engagement with the capstan puck 77 in the read position, whereby the tape 50 is moved into engagement with the transducers 56. When the lower motor 462 operates in such direction, contacts 268 are closed, as previously described, to energize the upper drum motor 466 to rotate the upper drum 40 into contact with the capstan puck 77 in the read position.

Assuming the user now operates the stop switch, the control circuit 452 responsively outputs a signal to the capstan control circuit 472 instructing the capstan motor 82 to decrease its speed to 15/32 ips. As the capstan motor slows to 15/32 ips, the capstan control circuit 472 provides a signal through the conductor 484 to the control circuit 452 indicating the system is phase locked at such speed. The control circuit 452 responsively sends a control signal to the frequency selector 474 instructing the capstan motor 82 to stop, and simultaneously provides a stop signal over the read mode conductor 458 to the lower drum motor 462. As the power to the lower drum motor 462 is interrupted, the spring 214 moves the lower drum 44 away from the capstan puck 77, rotates the roll pin 220 away and opens contacts 268 to the upper drum motor 466. With power interrupted, the upper drum motor 466 stops and spring 208 urges the upper drum away from the capstan puck 77, whereby both drums 40 and 44 are disengaged from the capstan 42 before the capstan comes to rest.

The control circuit 452 operates in a similar manner if the fast speed (320 ips) is selected. With such selection the control circuit 452 provides a command to the capstan control circuit 472 to operate the capstan motor 82 at 15/32 ips. When the phase lock signal on conductor 484 from the capstan control circuit 454 indicates that the capstan motor 82 is operating at 15/32 ips, the control circuit 452 provides an operating signal to the frequency selector 474 to output reference pulses for 320 ips and applies a signal over the tape lift conductor 454 to cause the lower drum motor 462 to rotate in the opposite direction to move the lower drum 44 into the tape lift position. As the drum 44 reaches the tape lift position, the contacts 270 are closed by the roll pin 220 and the upper motor 466 drives the upper drum 40 into the tape lift position.

The system is changed from the tape lift operation mode to the stop condition in the manner set forth with respect to change of the system from the read mode to the stop condition.

The capstan control circuit 472 may be a speed control circuit of the general type shown in U.S. Pat. No. 3,500,162 which is assigned to the assignee of this invention. In such circuit, the phase of the pulse output of a crystal is compared with pulses which represent the rotating speed of the capstan motor as provided by an optical encoder (or alternatively with pulses recorded on the tape). The speed control circuit generates a DC potential which represents the instantaneous average value of the phase difference of the two signals with substantially zero time.

The present system, in a manner similar to the system there disclosed, therefore includes the optical encoder 478 coupled to the capstan motor 82 to provide pulses to a digital comparator 480 which pulses represent the actual speed of the capstan motor. The output of the crystal oscillator 476 is connected to a frequency selector circuit 474 which is a divider circuit which divides down the output of the crystal oscillator to different output frequencies as different frequencies are selected at its input. In the present example, the control circuit 452 provides the signal to the frequency selector 474 input to represent the one of the tape speeds desired, and the frequency select circuit divides the oscillator down to the pulse count which represents such speed, and outputs the same to the digital comparator 480 for reference purposes.

The digital comparator 480 compares the pulses from the optical encoder 478, which represents the actual capstan motor speed, with the reference pulses output from the frequency selector circuit and provides a DC potential output having a magnitude which is proportional to the phase difference of the two signals sent to the capstan motor 82 via the conductor 481. This causes the motor to adjust its speed in a direction so as to eliminate the phase difference. When the phase difference is zero or within limits, a phase lock signal is output over the phase lock conductor 484 to the control circuit 452. In the patent referenced above, such signal is derived by a phase detector circuit from conductor 74 (FIG. 1).

Thus, in the example described above, when the user selects a speed of 60 ips, the control circuit 452 first sends a signal to the inputs of the frequency selector circuit 474 requesting operation of the capstan motor at 15/32 ips, and the frequency selector circuit 474 divides the output of the crystal oscillator 476 to provide a pulse which represents the 15/32 ips speed to the digital comparator 480. When the phase lock signal in conductor 484 to the control circuit 452 indicates that the capstan servo 82 is operating at 15/32 ips, the control circuit outputs a signal to the frequency selector circuit 474 requesting operation of the capstan motor at the selected speed of 60 ips. The frequency selector circuit thereupon divides the pulse output of the crystal oscillator 476 to provide reference pulses to the digital comparator 480 to effect operation of the capstan motor 82 at the desired speed of 60 ips. The operation of the control circuit 452 and its associated circuit is described in more detail in the application which is being filed by the assignee in the matter of U.S. patent application Ser. No. 897,136, filed Apr. 17, 1978.

What is claimed is:

1. A short loop tape transport for use with a tape supply source, transducer means and a tape take-up source, comprising: first and second drum members, each having a tape-carrying surface and a friction drive surface, said drum members being mounted for rotation about respective laterally spaced, substantially coplanar axes in the proximity of said transducer means, said tape extending in partial wrapping engagement about said tape-carrying surfaces of said drum members; a driven capstan having a peripheral drive surface; means for mounting said capstan between said drum members with the drive surface thereof in driving engagement with the friction drive surfaces of said drum members, whereby said drums are directly driven by the same drive element and said tape-carrying surfaces of said drums have the same tangential velocity.

2. A short loop tape transport in accordance with claim 1 in which:
the drive axis of said capstan is spaced on a side of the plane of the rotational axes of said drum members away from said transducer; and further comprising means for pivotally mounting the axes of rotation of said drum members for moving their centers of rotation away from said transducer and away from the center of rotation of said capstan to define an idle position in which said tape is displaced from operable contact with said transducer.

3. A short loop tape transport in accordance with claim 2 further comprising:
power means for effecting said pivotal movements; and sequencing drive means for moving the rotational axis of one drum member prior to the pivotal movement of the other drum member to move said tape from operable contact with said transducer.

4. A short loop tape transport in accordance with claim 3 wherein said pivotal mounting means is further operative to move the centers of rotation of said drum members from said idle position to a position further away from said transducer to a transport position with said frictional drive surfaces of said drum members in driven engagement with the peripheral drive surfact of said capstan.

5. A short loop tape transport in accordance with claim 1 in which:
the drive axis of said capstan is spaced on a side of the plane of the rotational axes of said drum members away from said transducer; and further comprising first and second mounting means for mounting the axes of rotation of said drum members for pivotal movement away from said transducer and away from the center of rotation of said capstan to an idle position in which the tape is removed from operable contact with said transducer and said frictional drive surfaces are out of driven engagement with said frictional drive surface of said capstan and to a transport position further away from said transducer in which said frictional surfaces are again in driven engagement with the frictional drive surface of said capstan; and power means coupled to said first and second mounting means for effecting said pivotal movements to and from said idle position.

6. A short loop tape transport in accordance with claim 5 further comprising:

first tape tensioning and centering vacuum chamber means between said tape supply source and one of said drum members for controlling the tension on said tape; and second tape tensioning and centering vacuum chamber means between said tape take-up source and the other of said drum members for controlling the tension on said tape.

7. A short loop tape transport in accordance with claim 6 in which:

said first and second vacuum chamber means each have an entrance and an exit slit for said tape; and further comprising means for generating a partial vacuum on the outer periphery of said tape within said first and second chamber means to form a continuous loop of said tape in each of said chamber means;

and a pair of rollers for each of said vacuum chamber means, one roller in each pair guiding said tape into an entrance slit and the other roller in each pair guiding said tape from an exit slit.

8. A short loop transport in accordance with claim 7 in which:

the axes of rotation of said rollers at the exit slit of one vacuum chamber and the entrance slit of the other vacuum chamber are spaced from each other and from the axes of rotation of said drum members such that said tape is entrained around each of the tape carrying surfaces of said drum members in major wrapping engagement.

9. A short loop tape transport in accordance with claim 1 in which:

the tape carrying surfaces of said drum members include a series of axially spaced circumferential grooves in their respective tape carrying surface.

10. A short loop tape transport in accordance with claim 9 in which:

said grooves on each of the tape carrying surfaces of said drum members are arranged in a pair of axially spaced groups, the axial width of each of said groups corresponding to the width of a tape and the total axial widths of said groups corresponding to the width of a second wider tape whereby the edges of each tape overlap the last groove on each side of its corresponding group to minimize tape wear.

11. A short loop tape transport in accordance with claim 9 in which:

each of said grooves is substantially semicircular in cross-section and their center depths are less than their radii.

12. A short loop tape transport in accordance with claim 2 in which:

the peripheral clearances of the tape carrying surfaces of said drums at idle position is at least about 0.1 inch.

13. A short loop tape transport in accordance with claim 2 in which:

the rotational axes of said drum members are pivotally mounted on fixed axes; and the sum of the radii of said drums and the diameter of said capstan is substantially equal to the centerline distance between said fixed axes.

14. A short loop tape transport in accordance with claim 1 further comprising first and second mounting means for mounting the rotatable axes of said drum members for pivotal motion about respective fixed crank axles; means mounting the drive axis of said capatan inbetween and substantially coplanar with said fixed crank axles of said first and second mounting means;

and the sum of the radii of said drums and the diameter of said capstan is substantially equal to the centerline distance between said fixed crank axles to define a peripheral clearance whereby said drum members are independently pivotable from an idle position wherein their friction drive surfaces are spaced from the peripheral drive surface of said capstan by said peripheral clearance to each side of said common plane, thereby carrying said tape into operable contact with said transducers on one side thereof and carrying said tape past said idle position to the other side thereof into a transport position.

15. A short loop tape transport in accordance with claim 1 in which:

the tape carrying surfaces of said drum members are positionable in relation to a transducer having a crown portion whereby to define a path of travel for said tape having a wrap angle of about 2° over said crown portion.

16. A short loop tape transport in accordance with claim 15 in which:

the tape carrying surface of said drum members are positionable in relation to a series of arcuately spaced transducer whereby to define said path of travel and wrap angle over each of the respective crown portions thereof.

17. A short loop tape transport in accordance with claim 1 wherein:

there is included at least one tape tensioning means between said tape supply source and said tape take-up source;

said tape tensioning means being defined by a vacuum chamber having substantially parallel spaced planar side walls and enclosing edge walls with an entrance slit and an exit slit for said tape whereby the application of a partial vacuum within said chamber entrains said tape in a loop within the chamber having a normal end position intermediate in the chamber;

light transmitting means in one edge wall of said chamber;

light detecting means in an opposite edge wall whereby said loop of tape in said normal position is monitored by said light transmitting and light detecting means producing a signal responsive to the relative length of said loop of tape; and motor drive means operably connected to said tape supply and take-up sources and responsive to said signal to rotate said sources to maintain said tape loop in said normal position.

18. A short loop tape transport for use in association with a tape supply source, a transducer and a tape take-up source comprising:

first and second drum members each having a tape carrying peripheral surface and a friction drive surface;

first and second mounting means for rotatably mounting said drum members on laterally spaced substantially coplanar axes in the proximity of said transducer;

a power driven capstan having a peripheral drive surface and mounted on a drive axis between said drum members;

third and fourth mounting means for pivotally mounting said first and second mounting means respectively whereby said axes of rotation of said drum members are pivotally movable such that their centers of rotation are displaced oppositely and arcuately away from a read position in which said tape is in operative relation with said transducer, and away from the center of rotation of said capstan to an idle position wherein said peripheral drive surfaces are spaced from the peripheral drive surface of said capstan and arcuately further away from said transducer to a transport position in which their frictional drive surfaces drivingly engage the peripheral drive surface of said capstan;

first and second power means for controlling said third and fourth mounting means respectively;

switch means responsive to the position of said third mounting means in said read and transport positions for actuating said second power means to drive said fourth mounting means to the corresponding position after said third mounting means has reached such position.

19. A tape transport assembly comprising:

a drive capstan;

a drive shaft rotatably supporting said capstan on a fixed axis;

reversible motor means coupled to said capstan drive shaft for rotation in both directions;

a pair of spaced drums each having a drive surface engageable with said capstan for rotation therewith at selected speeds and direction;

said drums each including a tape-carrying surface and cooperating to train a span of tape therebetween in operative relation with a transducer head;

crank means for each drum and each having a fixed rotational axis and a crank axle spaced from said associated fixed axis and rotatably supporting an associated drum;

each crank means being rotatable about its respective fixed rotational axis to swing its crank axle and the associated drum in an arc and thereby selectively move said drums and said span of tape between a first position, in which said capstan drivingly engages said drums and said tape span is in operative relation with said transducer head, a second position in which said drums are disengaged from said capstan, and a third position in which said capstan drivingly engages said drums and said tape span is removed from sid transducer head;

biasing means for moving said first and second crank means to said second position when torque is removed from said crank means; and torque motor means for selectively rotating said crank means about their respective fixed rotational axes overcoming said biasing means to move said drums to and from said first and third positions.

20. A tape transport in accordance with claim 19 including:

a block member providing support for said assembly;

a first gear member operably connected to said power means and affixed to one of said crank means at its fixed rotational axis for rotation therewith;

said biasing means comprises return springs supported by said block member and associated with said first gear member in spaced relationship;

said first gear member including a stop member positioned between said return springs for biasing contact therewith at the end of said arc of swing of said crank axle of said crank stop means to limit the rotation of said first gear member;

a second gear member operably connected to said power means, rotatably mounted on the other of said crank means at its fixed rotational axis;

said biasing means comprising return springs supported by said block member and associated with said second gear member in spaced relationship;

said second gear member including a stop member on one side thereof positioned between said return springs for biasing contact therewith before the end of said arc of swing of said crank axle of said crank means;

means resiliently connecting said second gear member to said other crank means about its fixed rotational axis for limited relative rotational movement;

said second gear member including protruding pin member on its other side;

a pair of normally open switch members adapted to control the operation of said motor means driving said first gear member and spaced from the center of said second gear member in the path of said protruding pin member;

one of said switch members, when closed, causing said power means to rotate said first gear member and said crank means to pivot said drums carrying said span of tape in operable relationship with said transducer head;

the other of said switch members when closed causing said power means to rotate said first gear member and said crank means to pivot said drums carrying said span of tape in the opposite direction out of operable relationship with said transducer head in a transport position whereby in each of said modes of operation said stop member strikes a return biasing spring for said second gear member and said resilient means is overcome by the torque of said power means sufficiently to allow said pin member to actuate said switch means.

21. A short loop tape transport in accordance with claim 17 in which:

said vacuum chamber is formed in two separate halves, the dividing line for said halves being located centrally along said edge walls;

said light transmitting and detecting means are contained in the opposite edge walls of one of said halves whereby said chamber can accommodate two different widths of tape, said half of said chamber with said light transmitting and detecting means accommodating one width of tape and the two halves accommodating a tape of twice said width.

22. The apparatus of claim 1 wherein said capstan includes a central hub and an outer layer of plastic resin providing said peripheral drive surface and engaging said friction drive surfaces of said drum members, said system further including means for selectively moving each of said drum members between an idle position in which said drum members are not driven by said capstan and an operative position at which said drum members are in driving engagement with said capstan and said tape is in operative relationship with said transducer means; and first and second stop means for limiting the positions of said drum members respectively relative to said resin surface of said capstan such that the radial distances between the axis of said capstan and the peripheries of said friction drive surfaces of said drum members along respective lines joining the axis of said capstan with the respective axes of said drum members are equal.

23. The apparatus of claim 22 wherein said resin is polyurethane characterized by its hardness, impact and abrasion resistance and machineability.

24. The apparatus of claim 22 wherein said stop means are adjustable over a continuous range.

25. The apparatus of claim 22 wherein said means for selectively moving said drum members comprises a crank shaft for each drum member, each crank shaft including a fixed axial portion and a movable axial portion, the axes of said movable axial portions being offset relative to said fixed axial portions in a distal direction relative to the axis of said capstan; first and second reversible drive motors coupled respectively to the fixed axial portions of said crank shafts; said drum members being mounted respectively on the movable axial portions of said crank shafts; and control means for actuating said first and second reversible motors to drive said crank shafts between a read position in which the movable portion of said crank shafts cause their respective drum members to drivingly engage said capstan and to place said tape in operative relationship with said transducer means, and a transport position in which said movable axial portions of said crank shafts move said drum members into driving engagement with said capstan but angularly displaced from said read position relative to the axis of said capstan such that said tape is not in operative relationship with said transducer means and said capstan may be driven at higher speeds than in said read position.

26. The apparatus of claim 25 wherein said first and second drum members comprise a control drum and a slave drum respectively, said system further comprising first and second drive gear means interconnecting said first and second drive motors with said first and second crank shafts respectively; first and second hub means fixedly attached to said crank shafts respectively; first and second adjustable stop means for each drum member adapted to engage said associated hub to positively limit the angular displacement of the associated crank shaft when said movable portions thereof are in said read and transport positions respectively.

27. The apparatus of claim 26 further comprising resilient coupling means for connecting said hub of said control drum member with its associated drive gear; and means responsive to the displacement of the drive gear of said control drum beyond the angular displacement of its associated hub at each of said read and transport positions to energize said second motor associated with said slave drum, whereby said control drum is located in one of said read and transport positions before said slave drum is moved to its corresponding position, and said slave drum is thereafter moved to slave the drive positions of said control drum.

28. The apparatus of claim 25 characterized in that said crank shafts are sequentially controlled relative to one another and the movable portions thereof transcribe an arc about the axis of the fixed portion thereof between said read and transport positions to displace the respective drum members through an arc defining an idle position between said read and transport positions in which said drum members are not in driving engagement with said capstan.

29. The apparatus of claim 28 further comprising resilient means for each of said crank shafts for biasing the same to said idle position when torque is removed therefrom.

30. The apparatus of claim 29 wherein said drive motors for said crank shafts are either slip clutch motors or stall motors, whereby said motors continue to exert torque on the respective crank shaft in either of said driving positions, and said motors remove torque from the associated crank shaft when de-energized to permit said resilient biasing means to return said crank shafts to said idle position wherein said drum members are not in driving engagement with said capstan.

31. The apparatus of claim 22 further comprising tape tensioning and centering vacuum chamber means between said tape supply source and a first drum member for controlling the tension on said tape; and tape tensioning and vacuum chamber means between said tape take-up source and the other of said drum members for controlling the tension on said tape.

32. The apparatus of claim 31 wherein each of said vacuum chamber means include an entrance and an exit slit for said tape, said system further comprising means for generating a partial vacuum on the other periphery of said tape within said chamber to form a continuous loop of said tape in each of said chambers; and a pair of rollers for each of said vacuum chamber means, one roller in each pair guiding said tape into an entrance slit and the other roller in each pair guiding said tape from an exit slit, the axes of rotation of said rollers at the exit slit of one vacuum chamber and the entrance slit of the other vacuum chamber being spaced from one another and from the axes of rotation of said drum members such that said tape is entrained around each of said tape carrying surfaces of said drum members in major wrapping engagement.

33. The apparatus of claim 22 wherein the tape carrying surfaces of said drum members define a series of axially spaced circumferential grooves arranged in pairs of axially spaced grooves, the axial width of each of said grooves corresponding to the width of said tape, and the total axial widths of said grooves corresponding to the width of a wider tape whereby the edges of each tape overlap the last groove on each side of its corresponding group to minimize tape wear.

34. The apparatus of claim 1 wherein said drum members support a span of said tape in operative relation with said transducer means to define a tape path; and wherein said transducer means comprises a plurality of magnetic heads having crowns spaced along said tape path between said drum members and defining an arc such that said tape has a wrap of approximately $2\frac{1}{2}°$ relative to the crown of each of said heads.

35. In a short loop tape transport for use with a tape supply source, transducer means and a tape take-up source, including first and second drum members, each having a tape-carrying peripheral surface and mounted for rotation about respective laterally spaced, substantially coplanar axes in the proximity of said transducer; said tape extending in partial wrapping engagement about said tape-carrying surface of said drum members, the improvement characterized by first and second shafts for mounting said drum members respectively; a driven capstan having a peripheral drive surface of resin material; means for mounting said capstan between said drum members; first and second support means carrying said first and second shafts respectively for independently moving said first and second drum members into driving engagement with said capstan at a read position in which the drive surface of said capstan is in driving engagement with the friction drive surfaces of said drum members; and in which a tape span supported between said drum members is in operative relation with said transducer means; and first and second adjustable stop means for independently limiting the movement of said first and second support means respectively in said read position such that the radial distances between the axis of rotation of said capstan and the engagement between said capstan and friction drive surfaces of said drum members are equal, whereby the tape-carrying surfaces of said drum members have the same tangential velocity.

* * * * *

UNITED STATES PATENT OFFICE
CERTIFICATE OF CORRECTION

Patent No. 4,122,504                    Dated October 24, 1978

Inventor(s) George P. Prozzo and Ellis Speicher

It is certified that error appears in the above-identified patent and that said Letters Patent are hereby corrected as shown below:

On the Title page under Inventors, correct that portion to read - George P. Prozzo, Rochester; Ellis
          Speicher, Petersburg; and
          Francis P. McGowan, Springfield, all
          of Illinois.

Signed and Sealed this

Thirteenth Day of February 1979

[SEAL]

Attest:

RUTH C. MASON
Attesting Officer

DONALD W. BANNER
Commissioner of Patents and Trademarks